Aug. 28, 1951    A. ZISKA    2,565,641
APPARATUS FOR MAKING SLITTED AND EXPANDED SHEET MATERIAL
Filed Aug. 21, 1946    4 Sheets-Sheet 3

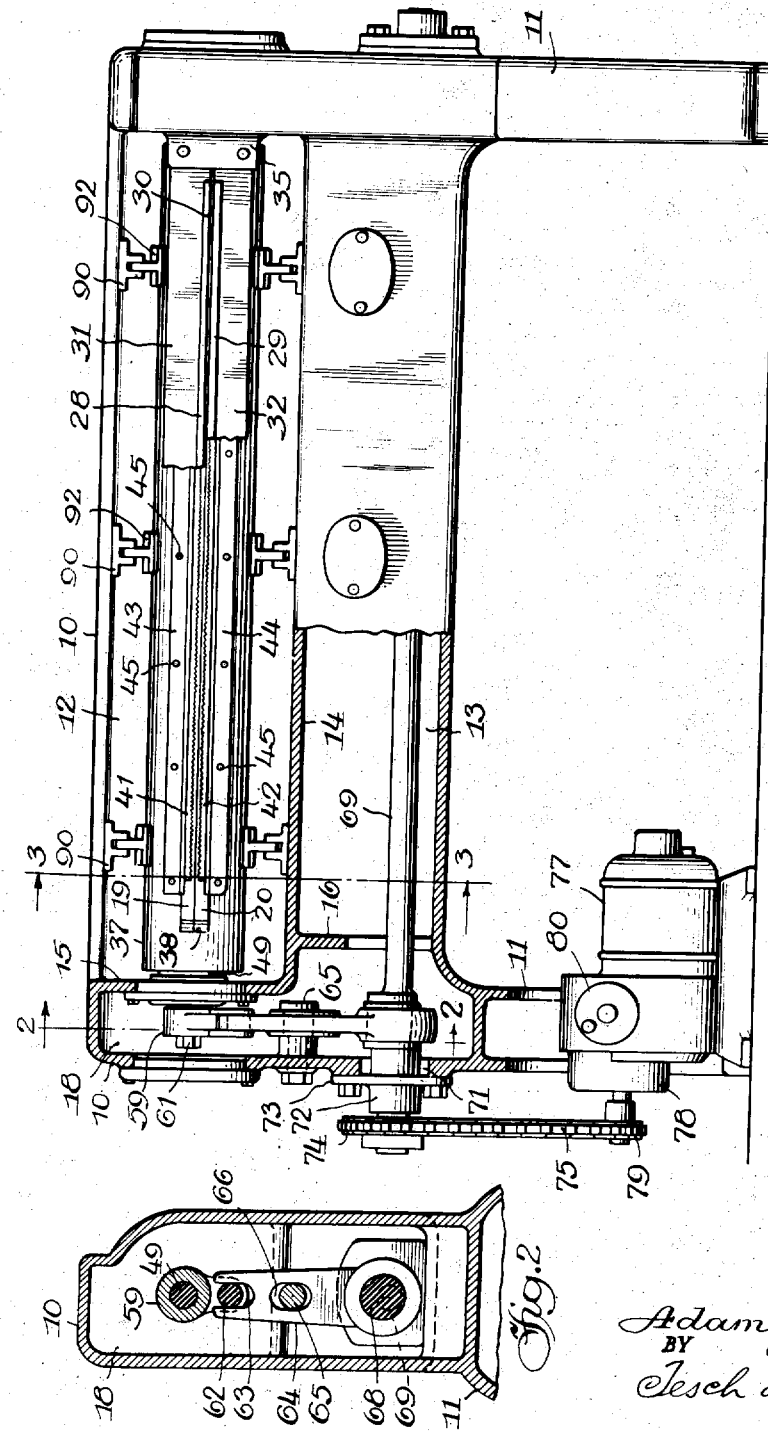

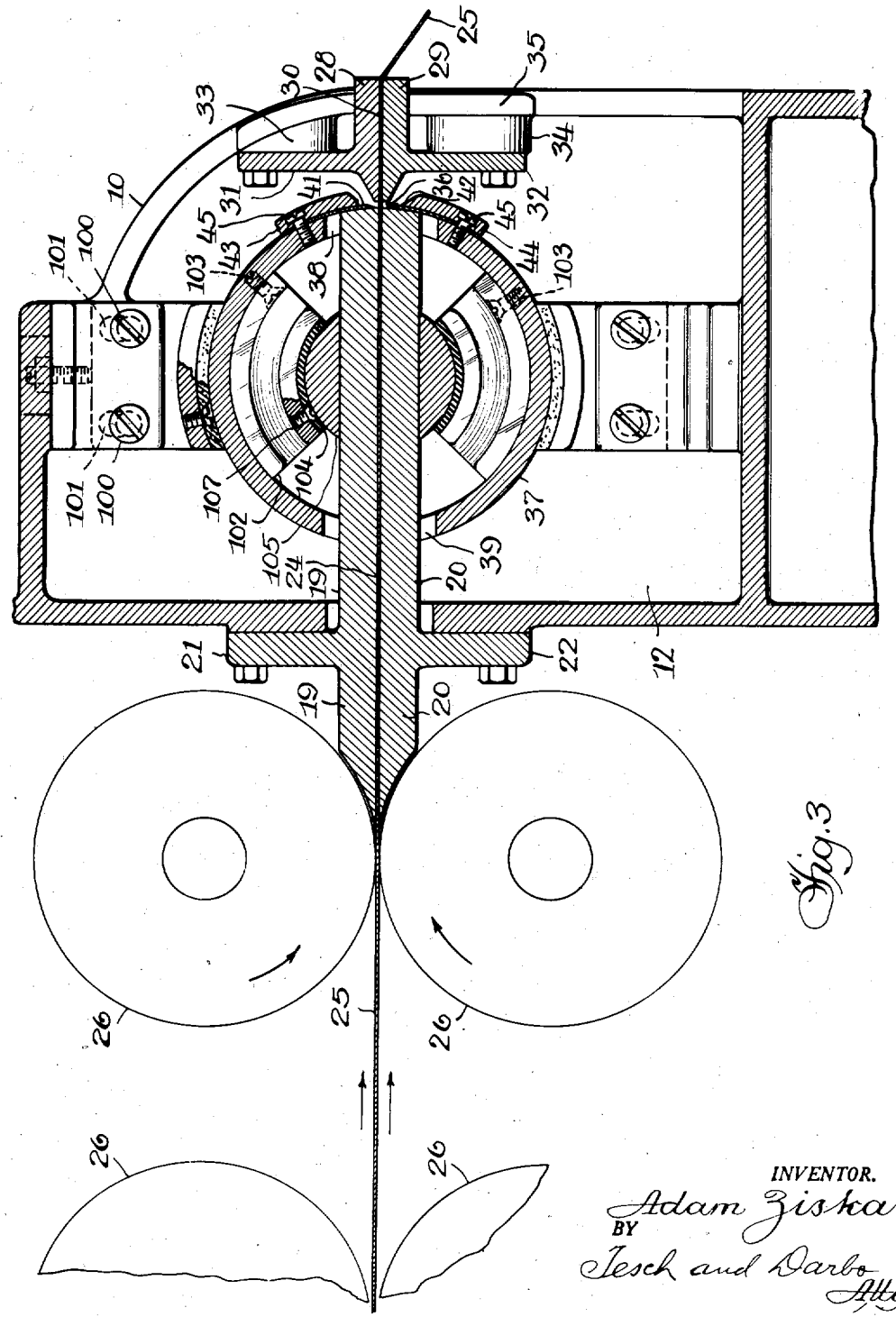

INVENTOR.
Adam Ziska
BY Jesch and Darbo
Attys

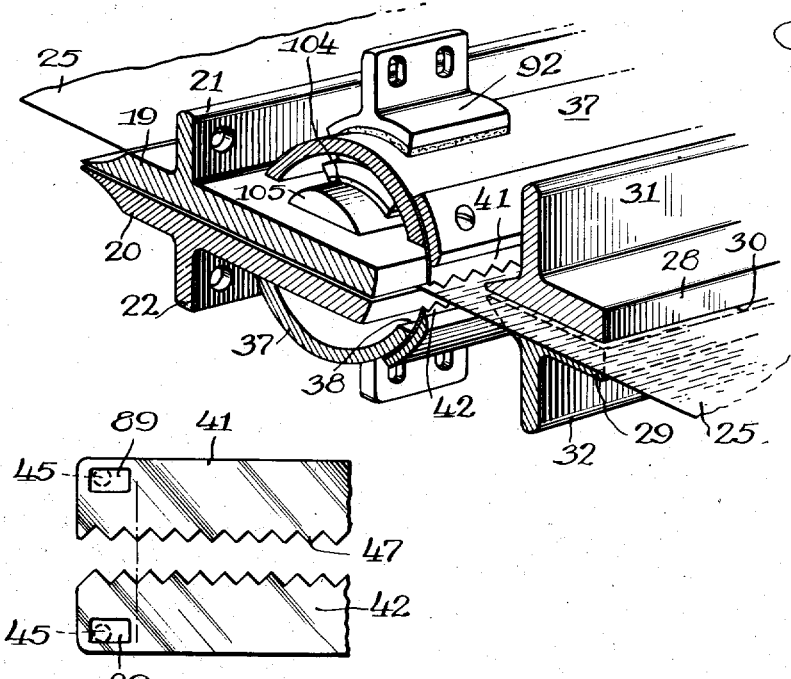
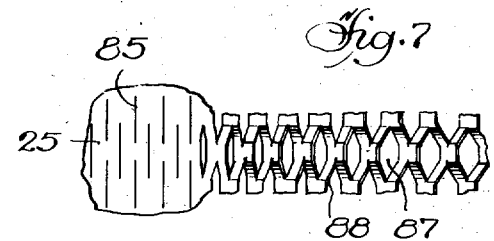
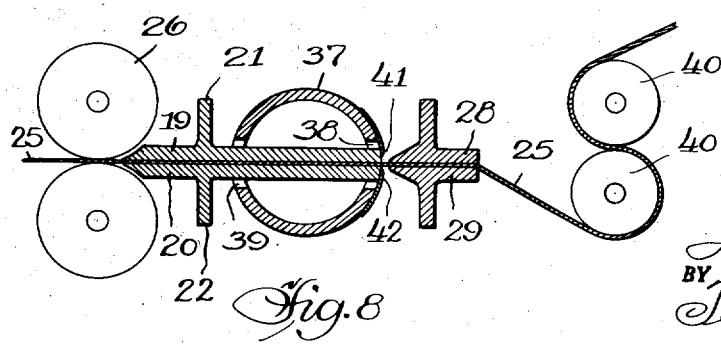

Patented Aug. 28, 1951

2,565,641

UNITED STATES PATENT OFFICE 2,565,641

APPARATUS FOR MAKING SLITTED AND EXPANDED SHEET MATERIAL

Adam Ziska, Wauwatosa, Wis., assignor to Research Products Corporation, Madison, Wis., a corporation of Wisconsin Application August 21, 1946, Serial No. 692,078

13 Claims. (Cl. 164—6.5)

1

This invention relates to improvements in apparatus for making slitted sheet material, and particularly to improvements in apparatus for slitting thin, flexible sheet material, such as paper, cloth, metal foil, etc., which, after being slitted, is adapted to be expanded by a stretching operation.

It is an object of the invention to provide an apparatus of the character mentioned which is accurate and dependable and cuts the slits cleanly in the desired location without tearing the sheet material.

It is a further object of the invention to provide an apparatus of the character mentioned in which the material to be slitted is fed continuously to the apparatus and the slitted product is delivered continuously.

It is a further object of the invention to provide an apparatus of the character mentioned which is capable of rapid operation and a large output of slitted sheet material.

It is another object of the invention to provide an apparatus of the character mentioned which is capable of operating upon wide widths of sheet material.

It is a still further object of the invention to provide an apparatus of the character mentioned which does not undergo weakening or fatigue and is capable of rapid operation over long periods of time.

Other objects and advantages will become apparent as the following description progresses which is to be taken in conjunction with the accompanying drawings, in which:

Fig. 1 is a front elevational view, partly in section, of the sheet slitting apparatus of the invention;

Fig. 2 is a sectional view of a portion of the apparatus, taken along line 2—2 of Fig. 1;

Fig. 3 is a sectional view of a portion of the apparatus taken along line 3—3 of Fig. 1;

Fig. 5 is a perspective view of a portion of the apparatus showing the principal sheet slitting elements;

Fig. 6 is a fragmental view showing the construction and arrangement of the sheet slitting cutters;

Fig. 7 is a fragmental view of a sheet as it goes from the slitted to the expanded condition; and Fig. 8 is a diagrammatic view showing the principal elements of the apparatus.

Figure 4:
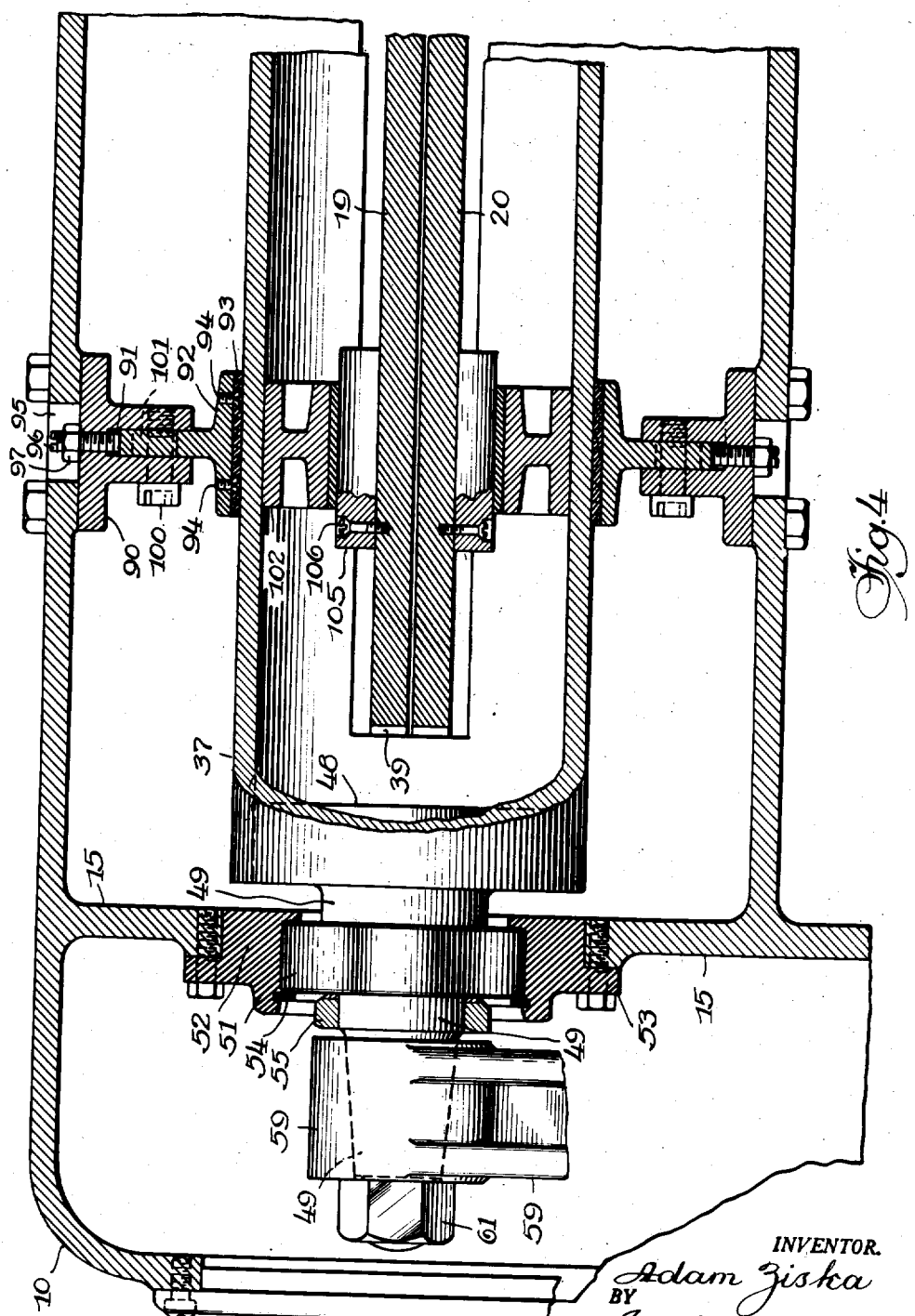
Fig. 4 is an enlarged front view, partly in section, of a portion of the apparatus.

The apparatus comprises a hollow main frame 10 which is supported upon legs 11. The frame is elongated across the apparatus and the main portion thereof is divided into upper and lower compartments 12 and 13 by a horizontal partition 14 which extends from a point adjacent to the left side of the apparatus, as viewed in

2

Fig. 1, to a similar point adjacent to the right side. At the first mentioned point, the partition 14 is joined by vertical partitions 15 and 16 to form a third compartment 18 at the left side of the apparatus. Similar vertical partitions which are not shown are provided at the right side of the apparatus to form a fourth compartment similar to compartment 18. The walls of the various compartments are substantially closed except for the front wall of the upper compartment 12, which is open.

As is shown in Fig. 3, top and bottom guide members 19 and 20 are supported rigidly upon the frame 10 by means of flanges 21 and 22 thereof which are bolted to the rearward wall of the frame as shown. The guide members 19 and 20 are spaced apart to form a guideway or slot 24 which is adapted to accommodate one or more thicknesses of the sheet material to be slitted, which sheet material is indicated at 25 and is adapted to be fed forwardly in the direction indicated by the arrows in Fig. 3, being continuously fed by the feed rolls 26 which are positively driven at adjustable speed by means which are not shown. For convenience, the direction of travel of the sheet 25 will be considered to be the longitudinal direction with respect to both the sheet and the apparatus. The guide members 19 and 20 extend forwardly into the interior of the hollow frame to a point spaced from the forward end of the frame, and they also extend rearwardly from the frame to a point adjacent to the sheet-advancing rolls 26. The guide members are tapered at their rearward ends to enable them to approach the rolls 26 more closely. A second pair of top and bottom guide members 28 and 29 are mounted upon the forward wall of frame 10 and are arranged so as to provide a guideway or slot 30 between them which is in alignment with slot 24. The guide members 28 and 29 have flanges 31 and 32 which are bolted to inwardly extending raised portions or lugs 33 and 34 (see Fig. 3) in brackets 35 (see Fig. 1) at the sides of frame 10. Only one of the brackets 35 is shown in Fig. 1, and a similar bracket and supporting arrangement for the guide members 28 and 29 are arranged at the opposite side of the frame. The guide members 28 and 29 have their rearward ends in adjacent spaced relation to the guide members 19 and 20 to form a gap 36 therebetween extending transversely of the apparatus. Said guide members 28 and 29 extend forwardly a substantial distance from the flanges 31 and 32. An additional pair of rolls 40 is located forwardly of the frame 10 and is adapted to draw the sheet 25 forwardly.

A continuous length of the sheet 25 is fed forwardly continuously by the rolls 26 and 40 through the slots 24 and 30 and across the gap 36. Means which will be described are provided for slitting the sheet as it passes the gap 36, and the rolls 40 are driven by means which are not shown at a rate such as to draw the sheet 25 forwardly at a rate more rapid than its rate of advance to the cutters, whereby the sheet is expanded.

Within the upper compartment 12 is a hollow cylindrical cutterhead 37 which has its axis lying within the plane of the slot 24 and extending transversely of the apparatus and parallel to the gap 36. The axis of the cutterhead 37 is located substantially midway between the front and rear walls of the compartment 12. The cutterhead is arranged for angular oscillation about its axis in a manner which will be described hereinafter. It has clearance openings 38 and 39 at the front and rear portions thereof to accommodate the guide members 19 and 20 during its oscillatory motion. Top and bottom cutters 41 and 42 are mounted upon the forward portion of the cutterhead and extend transversely of the apparatus for the full width of the sheet 25 and are arranged in spaced apart opposed relation. They are fastened in place by clamping bars 43 and 44 which are held by threaded bolts 45, which pass through openings in the clamping bars and the cutters and are screwed into threaded openings in the cutterhead 37. The arrangement of the cutters is such that when the cutterhead 37 is at the middle of its oscillatory stroke, the sheet 25 passes freely through the clearance space between the cutters, as shown in Fig. 3.

As is shown in Fig. 6, the cutters each have a row of spaced apart teeth 47, the teeth of one cutter being in staggered relation to those of the other. Each cutter is adapted to cut a row of spaced apart slits transversely of the sheet 25 at each angular oscillatory movement of the head 37, as will be described more in detail hereinafter. The cutterhead 37 is mounted for oscillatory motion at its ends. The end portions 48 of the head are solid and have spindles 49 extending outwardly therefrom. Only one end of the head and its associated parts is shown in Fig. 4, and the arrangement is similar at the other side of the apparatus. The spindle 49 is mounted in the bearing member 51, which may be of the ball or roller bearing type, which, in turn, is mounted within the bearing support 52 which is of generally annular shape and is adapted to fit into a circular opening in the vertical wall 15 and has a flange 53 which my be bolted to the wall 15 as shown or otherwise suitably fastened in place. Upon its inner side, the bearing member 51 rests against a shoulder of the support 52 and at its outer side is held in place by a spring snap ring 54, which fits in a groove in support 52. The bearing member 51 is also held in place on the spindle 49 on the inside by a shoulder, caused by an increase in the diameter of the spindle, and on the outside by a collar 55 rigidly mounted on the spindle.

A crank 59 is attached rigidly to the end portion of the spindle 49 and, in the position of the apparatus shown, extends downwardly and has crankpin 62 at the end thereof. The end portion of the spindle 49 is tapered as indicated in Fig. 4, and the cooperating opening in crank 59 is also tapered to fit upon the spindle. The crank is tightened into rigid engagement with the spindle by means of nut 61 which is threaded upon the end of the spindle.

The crankpin 62 is received in a slotted opening 63 in the upper end of a connecting rod 64 which is pivotally supported upon a pin 65 which is mounted upon the frame 10. The pin 65 is received in an opening 66 which is also elongated lengthwise of the connecting rod 64. At the lower end thereof, rod 64 is connected in motion transmitting relationship to an eccentric portion 68 of a drive rod 69. The drive rod 69 passes through an opening 71 in the wall of frame 10 and is mounted rotatably in a bearing member 72, which is supported by a plate 73 which, in turn, is bolted to the frame 10. A sprocket 74 is mounted fixedly upon the end of drive shaft 69, and is driven by chain 75, which is driven by the motor 77 through a suitable reduction gear 78 and sprocket 79. The reduction gear is preferably of the varying speed-ratio type, the ratio being variable by the turning of regulating wheel 80. This type of reduction gear is well known.

The drive shaft 69 extends to the right end of the apparatus, as the same is viewed in Fig. 1, and a mechanism similar to that which has been described is contained within the right end of the frame 10 and serves to transmit motion from the drive shaft 69 to the cutterhead 37.

In operation, the drive shaft 69 is driven by the motor 77 and transmits a circular motion to the lower end of connecting rod 64. Said rod undergoes a simultaneous pivotal and vertical motion upon pivot pin 65, the vertical motion being accommodated by the elongated opening 66 in the connecting rod. A circular motion is also undergone by the upper end of the connecting rod. The vertical component of said motion is accommodated in the lengthwise slot 63 at the end of the connecting rod and does not impart any motion to the crank 59. The horizontal component of the motion imparts an angular oscillatory motion to the crank by means of crankpin 62. Said oscillatory motion is transmitted from the crank 59 to the spindle 49 and thence to the cutterhead 37. When the cutterhead rotates in a clockwise direction, the cutters 41 and 42 move downwardly and when it rotates in a counterclockwise direction the cutters move upwardly. In the median position, i. e., when the crank 59 extends vertically downwardly, the sheet 25 passes midway through the clearance space between the top and bottom cutters. The sheet 25 is fed forwardly at any desired rate of speed, and a row of spaced apart slits is cut in a transverse direction across the sheet by the top cutter 41 during each quarter cycle while the said cutter is moving downwardly below the median position. During the next quarter cycle, the said cutter 41 moves upwardly and is withdrawn from the slits just formed. The sheet is held substantially stationary by the cutter during the time the cutter penetrates the sheet and again moves forwardly when the cutter moves free of the sheet. The slitted portion of the sheet undergoes longitudinal stretch to accommodate the momentary stoppage. During the third quarter cycle while the bottom cutter 42 moves upwardly above the median position, said cutter forms a second row of spaced apart slits across the sheet, this row being slightly to the rear of the first row, and the slits thereof being in staggered relation to those of the first mentioned row. During the fourth quarter cycle, while the bottom cutter blade is moving downwardly above the median position, said cutter is being withdrawn from the sheet. Again the sheet is held momentarily stationary while the cutter penetrates it, and then moves forwardly under the influence of rolls 26 and 40. Thereafter, the sequence of operations is repeated, and a continuous series of rows of slits extending across the sheet is formed, the slits of each row being in staggered relation to those of the adjacent row. The guide members 19 and 20 and 28 and 29 support the sheet 25 against the vertical forces exerted upon it by the cutters as they pierce the sheet and withdraw from the slits. The apparatus locates the slits accurately in the sheet and forms them cleanly and without tearing the material. The sheet 25 is drawn forwardly by the rolls 40 at a rate more rapid than the rate at which the rolls 26 feed said sheet to the cutters, and as a result, the slits are opened and the sheet is expanded in a longitudinal direction. The apparatus of the invention is adapted for high speed operation, in which the cutterhead oscillates at a rate of up to three thousand cycles per minute.

A fragment of the sheet 25 as it passes from the slitted to the expanded condition is shown in Fig. 7. The slits 85 are arranged in parallel rows, the rows being relatively close together, the slits of one row being spaced apart and the slits of adjacent rows being in staggered relation to each other. In the expanded portion of the sheet, the slits have been opened up to form the diamond shaped openings 87 within a network of narrow webs 88 of the sheet material.

The pattern of slits and of the final expanded sheet may be altered at will. This may be done by varying the speed-ratio of the reduction gear 78 by turning regulating wheel 80, while maintaining substantially constant the speed of the feed rolls 26 and 40. The rows of slits are close together or far apart, and the webs 88 are consequently narrow or wide, depending upon the rapidity of oscillation of the cutterhead, which is determined by the speed of the output sprocket 79 of reduction gear 78. The pattern of slits may also be altered by shifting one of the cutters lengthwise with respect to the other, and in such case, the openings of the expanded sheet are not diamond shaped, but are of an unsymmetrical shape. The pattern may also be altered by varying the size of the teeth of the cutters or the depth to which they penetrate the sheet. This results in a variation in the length of slits with a resulting variation in the size of opening. The depth of penetration of the teeth is adjustable by shifting the cutters crosswise upon the head 37. Shifting of the cutters lengthwise and crosswise is provided for by the openings 89 in the cutter, which openings are larger both lengthwise and crosswise of the cutter than are the screws 45, as is shown in Fig. 6.

While the apparatus of the invention is adapted for making slitted sheet material of any desired width, it is especially advantageous for use with wide widths where large production is desired, and widths of 72 inches and greater are quite feasible. Means are provided in the apparatus described for increasing the rigidity of the oscillating cutterhead of wide machines, and reducing to a minimium the vibration and fatigue to which the rapidly operating wide machines are otherwise subject. Such means comprise bearing members in supporting relation to the cutterhead, and are illustrated in Figs. 1, 3 and 4. The supporting members are preferably arranged so as to support the interior and the exterior surfaces of the hollow cutterhead at substantially the same location as is illustrated in Fig. 4, that is, the supporting members support opposite sides of the same portion of the head. The exterior supporting member consists of a T-shaped bracket 90, the top of which is bolted to the top wall of the frame 10, as shown in Fig. 4, and the base of which extends downwardly toward the cutterhead and is bifurcated lengthwise to form a slot 91 therein. A second T-shaped bracket or shoe 92 has its base extending upwardly into the slot 91 and its top extending downwardly toward the cutterhead 37. An arc-shaped member of frictionless bearing material 93, which may be composed of the porous graphite-impregnated bronze material known as "Oilite," is arranged between shoe 92 and the cutterhead, and may be fastened to the shoe by the screws 94. An adjusting screw 96 is screwed into a threaded opening extending through the top of said bracket, which opening communicates with the slot 91. The adjusting screw 96 is employed to obtain the desired firm contact between the bearing member 93 and the cutterhead and is locked in position by locking nut 97. An opening 95 in the top wall of the frame 10 provides access to the screw 96 and nut 97. The screw 96 bears against the end of the base of shoe 92, and the pressure of the shoe against the cutterhead is regulated by turning the screw. The shoe is held against movement longitudinally of the apparatus by a pair of threaded bolts 100 which pass through coinciding openings in the bases of bracket 90 and shoe 92. The openings 101 in the shoe 92 are elongated vertically to accommodate the mentioned adjustment of the shoe, and at least a portion of the openings in the bracket 90 are threaded to hold the bolts 100 in position.

A second shoe 102 supports the interior surface of cutterhead 37 at substantially the same location where shoe 92 supports the exterior surface. This is the prefered arrangement, although the interior and exterior shoes need not be at the same locations but may be located at any desired position. The shoe 102 is rigidly fastened to the cutterhead by a plurality of screws, one of which is shown at 103 (see Fig. 3). The opposite surface of the shoe 102 has an arc-shaped bearing member 104 attached thereto by screws, one of which is shown at 107, and cooperates with a supporting member 105 which is rigidly mounted upon the top guide member 19 and fastened thereto by a plurality of screws, one of which is indicated at 106 (see Fig. 4). The bottom surface of the supporting member 105 is flat and its top surface is cylindrical to cooperate with the arc-shaped bearing member 104.

In the apparatus illustrated, six pairs of the supporting shoes are employed, as is shown in Fig. 1, all being similar to the pair which has been described, three pairs cooperating with the top and the other three pairs cooperating with the bottom of the cutterhead. Two pairs are located approximately midway between the ends of the cutterhead and two pairs are located adjacent to each end of the cutterhead. The number and arrangement of the supporting shoes are not critical and any desired number and arrangement may be employed depending upon the requirements for support and suppression of vibration.

In operation, the exterior shoes 92 remain stationary while the cutterhead slides back and forth in contact with them during its oscillatory motion. The internal shoes 102 move with the cutterhead and slide back and forth in contact with the supporting members 105. The latter provide firm support for the shoes 102, since the guide members 19 and 20 are rigidly supported upon the frame 10. The result is that the cylindrical wall of the cutterhead is firmly supported by the shoes 92 and 102 and any tendency on its part to vibrate and undergo fatigue with continued rapid operation is resisted.

While only a single modification of the apparatus has been described, the invention is not restricted thereto and various alterations and modifications may be made within the scope thereof. For example, while the apparatus is shown and described as operating upon a single sheet, it is quite capable of operating upon several sheets simultaneously and the slots formed by the guide members 19, 20, 28 and 29 may be made sufficiently wide to accommodate the desired number of sheets.

What is claimed is:

1. Apparatus for making expanded sheet material, comprising means forming a substantially stationary slot, means for advancing a sheet in a longitudinal direction in said slot, said slot forming means having a gap therein extending in a transverse direction to said sheet, a hollow, generally cylindrical cutterhead mounted for angular oscillation about an axis extending in a transverse direction, a portion of said slot forming means being located within said hollow cutterhead, said cutterhead having openings in opposite portions thereof to accommodate said sheet, a pair of cutters mounted on said cutterhead on opposite sides respectively of one of said openings in said cutterhead, said cutters being arranged in opposed relation to each other and each comprising a row of spaced apart teeth, the individual teeth of one cutter being in staggered relation to those of the opposite cutter, said cutterhead and associated cutters being so constructed and arranged that at each angular movement of said head a cutter moves across the plane of said slot within said gap and is adapted to cut a line of spaced apart slits in said sheet, means for imparting angular oscillatory motion to said cutterhead, and means for drawing the slitted portion of said sheet forwardly at a rate more rapid than the rate of advance to said cutters whereby said slits are opened and said sheet is expanded.

2. A sheet expanding apparatus as claimed in claim 1, in which one or more bearing members are mounted upon said slot forming means within said cutterhead, about which bearing members said cutterhead makes said angular oscillation with relation to said slot forming means.

3. Apparatus for making slitted sheet material, comprising a pair of guide members arranged in adjacent, spaced apart relation to form a guideway therebetween, said guide members having aligned gaps therein extending in a transverse direction to form a transverse gap in said guideway, means for advancing a sheet in a longitudinal direction in said guideway, a hollow cutterhead mounted for angular oscillation about an axis lying generally within the plane of said guideway and extending in a transverse direction, one of said guide members lying within said hollow cutterhead, said cutterhead having openings in opposite portions thereof to accommodate said sheet, a pair of cutters mounted on said cutterhead on opposite sides respectively of one of said openings in said cutterhead, said cutters being arranged in opposed relation to each other and each comprising a row of spaced apart teeth, the individual teeth of one cutter being in staggered relation to those of the opposite cutter, said cutterhead and associated cutters being so construced and arranged that at each angular movement of said head a cutter moves across the plane of said guideway within said gap and is adapted to cut a line of spaced apart slits in said sheet, and means for imparting angular oscillatory motion to said cutterhead.

4. Apparatus for making slitted sheet material, comprising a pair of guide members having aligned slots extending longitudinally therein, said guide members being in adjacent, spaced apart relation in a longitudinal direction to form a transverse gap therebetween, means for advancing a sheet longitudinally in said slots, a hollow cutter head mounted for angular oscillation about an axis extending generally in the the plane of said slots and parallel to said gap, one of said guide members lying within said hollow cutterhead, said cutterhead having openings in opposite portions thereof to accommodate said sheet, a pair of cutters mounted on said cutterhead on opposite sides respectively of one of said openings in said cutterhead, said cutters being arranged in opposed relation to each other and each comprising a row of spaced apart teeth, the individual teeth of one cutter being in staggered relation to those of the opposite cutter, said cutterhead and cutters being so constructed and arranged that with angular oscillation of said cutterhead said cutters move alternately in opposite directions within said gap and across the plane of said slots and are adapted to cut lines of spaced apart slits in said sheet, and means for imparting angular oscillatory motion to said cutterhead.

5. A sheet slitting apparatus as claimed in claim 4, in which there is means to position at least one of the cutters adjustably in a transverse direction whereby the pattern of slits in the slitted sheet is variable.

6. Apparatus for making expanded sheet material, comprising guide means adapted to provide lateral support for both sides of said sheet and along which said sheet may be advanced, means for advancing a length of said sheet material in a longitudinal direction along said guide means, a cutterhead mounted for angular oscillation about an axis, said cutterhead having an opening therein adapted to accommodate said advancing sheet, a pair of cutters mounted on said cutterhead on opposite sides respectively of said opening, said cutters being arranged in opposed relation to each other, each of said cutters having a row of spaced apart teeth, the individual teeth of one cutter being in staggered relation to the teeth of the opposite cutter, said cutterhead and cutters being so constructed and arranged that with angular oscillation of said cutterhead said cutters move alternately in opposite directions across the plane of the advancing sheet and are adapted to cut a series of rows of spaced apart slits in said advancing sheet, means for imparting angular oscillation to said cutterhead, and means for drawing the slitted portion of said sheet forwardly at a rate more rapid than the rate of advance to said cutters.

7. Apparatus for making expanded sheet material, comprising guide means adapted to provide lateral support for both sides of said sheet and along which said sheet may be advanced, means for advancing a length of said sheet material in a longitudinal direction along said guide means, a cutterhead mounted for angular oscillation about an axis, said cutterhead having an opening therein adapted to accommodate said advancing sheet, a pair of cutters mounted on said cutterhead on opposite sides respectively of said opening, said cutters being arranged in opposed relation to each other, said cutterhead and cutters being so constructed and arranged that with angular oscillation of said cutterhead said cutters move alternately in opposite directions across the plane of the advancing sheet and are adapted to cut a series of rows of spaced apart slits in said advancing sheet, means for imparting angular oscillation to said cutterhead, and means for drawing the slitted portion of said sheet forwardly at a rate more rapid than the rate of advance to said cutters.

8. Apparatus for making slitted sheet material, comprising guide means adapted to provide lateral support for both sides of said sheet and along which said sheet may be advanced, means for advancing a length of said sheet material in a longitudinal direction along said guide means, a cutterhead mounted for angular oscillation about an axis, said cutterhead having an opening therein adapted to accommodate said advancing sheet, a pair of cutters mounted on said cutterhead on opposite sides respectively of said opening, said cutters being arranged in opposed relation to each other, said cutterhead and cutters being so constructed and arranged that with angular oscillation of said cutterhead said cutters move alternately in opposite directions across the plane of the advancing sheet and are adapted to cut a series of rows of spaced apart slits in said advancing sheet, and means for imparting angular oscillation to said cutterhead.

9. Apparatus for making expanded sheet material, comprising top and bottom guide members between which a sheet may be advanced, means for advancing a sheet between said guide members, a pair of top and bottom cutters, a support for said cutters mounted for angular oscillation, said cutters each comprising a row of spaced apart teeth, the individual teeth of one cutter being in staggered relation to those of the opposite cutter, said support and cutters being so constructed and arranged that with each angular oscillatory cycle of said support said top and bottom cutters move transversely of said guide members and are adapted to cut two lines of spaced apart slits in said sheet, means for imparting angular oscillation to said support, and means for drawing the slitted portion of said sheet forwardly at a rate more rapid than the rate of advance to said cutters whereby said slits are opened and said sheet is expanded.

10. Apparatus for making slitted sheet material, comprising spaced apart guide members forming a guideway therebetween adapted to provide lateral support for both sides of said sheet, means for advancing a sheet forwardly in a longitudinal direction in said guideway, said guide members having aligned gaps therein extending in a transverse direction to form a transverse gap in said guideway, a pair of adjacent, spaced apart cutters arranged in opposed relation to each other, means for supporting said cutters for angular oscillation, said supporting means having an opening therein for the passage of said sheet, said cutters and supporting means being so arranged with respect to said guideway that the advancing sheet passes between said cutters and with angular oscillation of said supporting means said cutters move alternately in opposite directions across said gap and cut rows of slits in the advancing sheet, and means for imparting angular oscillation to said supporting means.

11. Apparatus for making expanded sheet material, comprising means forming a guideway adapted to provide lateral support for said sheet and along which said sheet may be advanced, a pair of adjacent, spaced apart cutters arranged in opposed relation to each other, support means for said cutters mounted for angular oscillation, means for advancing a sheet in said guideway, said support means and cutters being so arranged with respect to said guideway that the advancing sheet passes between said cutters and with angular oscillation of said support means said cutters move alternately in opposite directions across said guideway and are adapted to cut rows of slits in said advancing sheet, means for imparting angular oscillation to said support means, and means for drawing the slitted portion of said sheet forwardly at a rate more rapid than the rate of advance to said cutters.

12. Apparatus for making slitted sheet material, comprising means forming a guideway adapted to provide lateral support for said sheet and along which said sheet may be advanced, a pair of adjacent, spaced apart cutters arranged in opposed relation to each other, support means for said cutters mounted for angular oscillation, said support means having an opening therein for the passage of said sheet, means for advancing a sheet in said guideway, said support means and cutters being so arranged with respect to said guideway that the advancing sheet passes between said cutters and with angular oscillation of said support means said cutters move alternately in opposite directions across said guideway and are adapted to cut rows of slits in said advancing sheet, and means for imparting angular oscillation to said support means.

13. Apparatus for making slitted sheet material, comprising spaced apart guide members forming a guideway therebetween adapted to provide lateral support for both sides of said sheet, means for advancing a sheet forward in a longitudinal direction in said guideway, said guide members having aligned gaps therein extending in a transverse direction to form a transverse gap in said guideway, a cutter, means for supporting said cutter for angular oscillation, said cutter supporting means having an opening therein for the passage of said sheet, said cutter and supporting means being so arranged that with angular oscillation of said supporting means said cutter moves across said gap and cuts rows of slits in the advancing sheet, and means for imparting angular oscillation to said supporting means.

ADAM ZISKA.

REFERENCES CITED

The following references are of record in the file of this patent:

UNITED STATES PATENTS

| Number | Name | Date |
|---|---|---|
| 766,181 | Golding | Aug. 2, 1904 |
| 1,020,550 | Graham | Mar. 19, 1912 |
| 1,930,330 | Wattleworth | Oct. 10, 1933 |

FOREIGN PATENTS

| Number | Country | Date |
|---|---|---|
| 24,831 | Great Britain | Nov. 14, 1903 |

Certificate of Correction

Patent No. 2,565,641 August 28, 1951

ADAM ZISKA

It is hereby certified that error appears in the printed specification of the above numbered patent requiring correction as follows:

Column 3, line 52, for "my" read *may*; column 7, line 21, strike out "to said sheet"; line 75, for "construced" read *constructed*;

and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*